O. JAHN.
VEHICLE SHAFTS.
APPLICATION FILED NOV. 20, 1912.
1,079,858.
Patented Nov. 25, 1913.
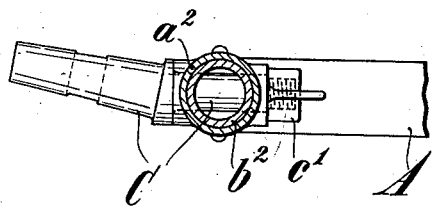
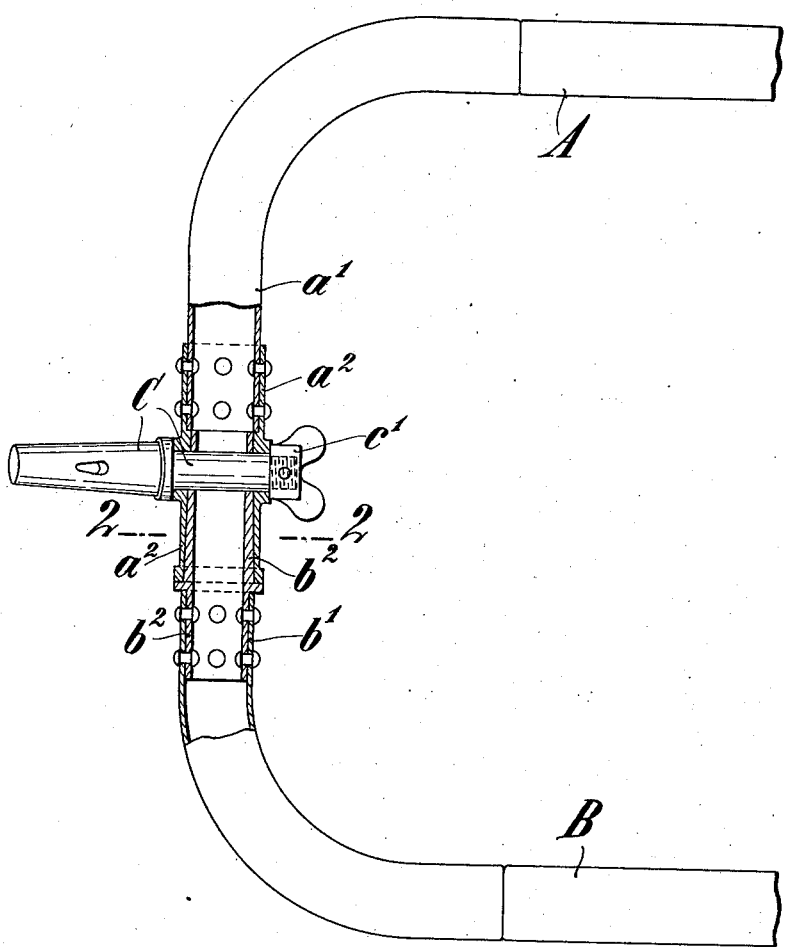
Witnesses
J. M. Wynkoop.
J. T. Stanley.
Inventor,
Otto Jahn,
By Knight Bros
Attorneys.

UNITED STATES PATENT OFFICE.

OTTO JAHN, OF ESSEN/WEST, GERMANY, ASSIGNOR TO FRIED. KRUPP AKTIENGESELLSCHAFT, OF ESSEN-ON-THE-RUHR, GERMANY.

VEHICLE-SHAFT.

1,079,858.  Specification of Letters Patent.  Patented Nov. 25, 1913.

Application filed November 20, 1912. Serial No. 732,577.

*To all whom it may concern:*

Be it known that I, OTTO JAHN, residing at Essen/West, Germany, a subject of the Emperor of Germany, have invented a certain new and useful Improvement in Vehicle-Shafts, of which the following is a specification.

The present invention relates to vehicle shafts constructed in pairs and which are particularly intended for use with mountain artillery, that is to say artillery which is transported upon pack animals.

The object of the invention is to provide a readily demountable shaft structure that is divisible into two parts symmetrical and of approximately equal weight, fitted together by a single connection at the middle of the cross bar and interlocked by a single readily removable key; also to have such key serve as draft connection for the shafts.

A preferred form of the subject matter of the invention is shown in the drawing, in which—

Figure 1 is a plan view, partially in section, of the shafts with the ends broken away, and Fig. 2 is a section on the line 2—2 of Fig. 1.

The pair of shafts consists of two members, each of which is formed substantially of a fork arm A or B and a part $a^1$ or $b^1$. The parts $a^1$ and $b^1$ together form the crosspiece, which connects the fork arms. To the cross piece part $a^1$ is attached a sleeve $a^2$ in which is telescoped a hollow pin $b^2$ attached to the cross piece $b^1$. The two members of the pair of shafts are connected in an easily detachable manner by a middle pin C provided for the attachment of the pair of shafts to the vehicle and, therefore, serving as a draft attachment; which pin C is passed through holes in the sleeve $a^2$ and the hollow pin $b^2$ and secured by a wing nut $c^1$ which forces the assembled cross piece firmly against the shoulder of the key pin and transmits the draft from the shafts to the pin.

After the pin C has been removed, the pair of shafts can be separated into two approximately symmetrical members, so that when one member of the pair of shafts is placed on one side of the saddle and the other member of the pair of shafts on the other side of the saddle, the weight of the pair of shafts is uniformly distributed upon the pack animal. It is obvious of course that the two members of the pair of shafts might be made exactly symmetrical.

I claim:—

1. A demountable shaft structure comprising a pair of shaft members, each carrying a part of the cross bar, said cross bar parts being telescoped together intermediately of the shaft structure, and a draft pin removably inserted through said telescoping parts and keying the parts together.

2. A demountable shaft structure comprising a pair of shaft members, each carrying a part of the cross bar, said cross bar parts being telescoped together intermediately of the shaft structure, and a draft pin removably inserted through said telescoping parts and keying the parts together; said draft pin being provided with a nut on its forward end releasably holding the pin in place and transmitting the draft from the shafts to the draft pin.

The foregoing specification signed at Barmen, Germany, this 30th day of October, 1912.

OTTO JAHN. [L. S.]

In presence of—
 HELEN NUFER,
 ALBERT NUFER.